United States Patent [19]
Button et al.

[11] Patent Number: 6,011,644
[45] Date of Patent: Jan. 4, 2000

[54] HYBRID FIBER AMPLIFIER

[75] Inventors: Leslie J. Button, Big Flats; Mark A. Newhouse, Corning; Z. George Pan, Painted Post, all of N.Y.

[73] Assignee: Corning Incorporated, Corning, N.Y.

[21] Appl. No.: 08/281,732

[22] Filed: Jul. 29, 1994

[51] Int. Cl.[7] ........................................................ H01S 3/00
[52] U.S. Cl. ........................................................ 359/341
[58] Field of Search ............................................ 359/341

[56] References Cited

U.S. PATENT DOCUMENTS

| | | | |
|---|---|---|---|
| 5,050,949 | 9/1991 | DiGiovanni et al. . | |
| 5,111,334 | 5/1992 | Heidemann . | |
| 5,131,069 | 7/1992 | Hall et al. ....................... | 385/142 |
| 5,177,634 | 1/1993 | Way . | |
| 5,233,463 | 8/1993 | Grasso et al. ...................... | 359/341 |
| 5,253,104 | 10/1993 | Delavaux . | |
| 5,280,383 | 1/1994 | Federici et al. . | |
| 5,392,153 | 2/1995 | Delavaux ........................... | 359/341 |

FOREIGN PATENT DOCUMENTS

| | | |
|---|---|---|
| 0232077 | of 0000 | European Pat. Off. . |
| 0523692 | of 0000 | European Pat. Off. . |
| 0547560 | of 0000 | European Pat. Off. . |
| 06013866 | of 0000 | European Pat. Off. . |
| 2-157132 | of 0000 | Japan . |
| 6-263468 | of 0000 | Japan . |
| 2067180 | of 0000 | United Kingdom . |

OTHER PUBLICATIONS

J.M.P. Delavaux et al., "REAP: Recycled Erbium Amplifier Pump", IEEE Photonics Technology Letters, vol. 6, No. 3, Mar., 1994, pp. 376–379.

*Optical Properties of Glass*, edited by D. R. Uhlmann and J.J. Kreidl, published by the American Ceramic Society, Inc., pp. 38–44.

G. Kotelly "Rare–earth–doped fluoride fibers ready to pump up applications", Lightwave, vol. 11, No. 8, Jul. 1994, p. 6.

D. J. DiGiovanni et al. "Tailor Fiber Design to Optimize Amplifier Performance", Laser Focus World, Sep. 1993, p. 95.

*Primary Examiner*—Mark Hellner
*Attorney, Agent, or Firm*—William Greener

[57] ABSTRACT

The present invention relates to a multi-wavelength multi-stage fiber amplifier exhibiting high power output with a flat balanced gain spectrum. The input stage exhibits a given passive loss and a flattened gain spectrum. The output stage exhibits a passive loss that is lower than the given passive loss and a gain spectrum that is less flat than the gain spectrum of the input stage. In a system utilizing erbium-based gain fibers, the input stage gain fiber can contain an amount of alumina sufficient to provide the desired gain spectrum flatness, while the output stage gain fiber has an alumina concentration sufficiently low to render that stage essentially lossless.

20 Claims, 1 Drawing Sheet

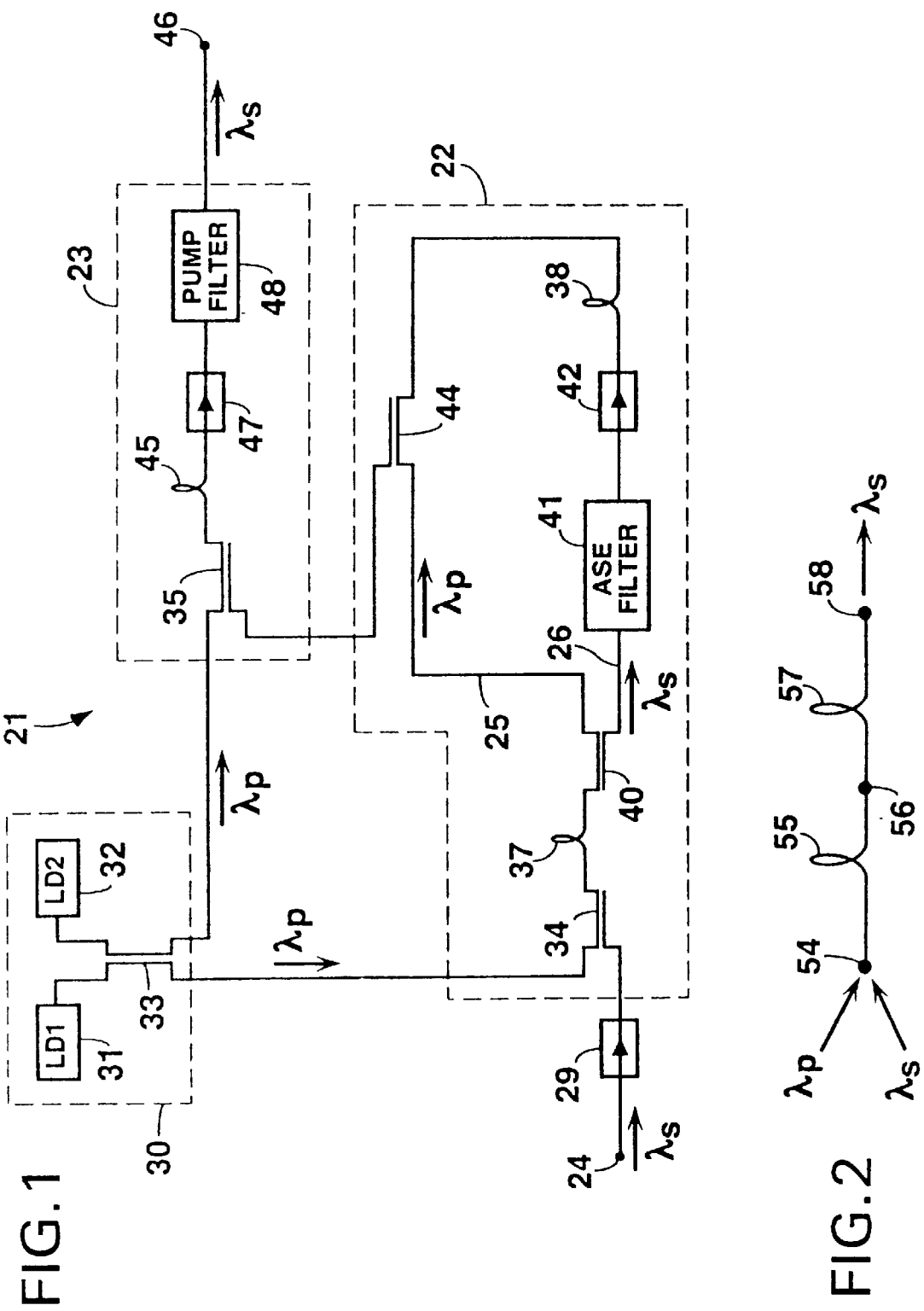

HYBRID FIBER AMPLIFIER

BACKGROUND OF THE INVENTION

The present invention relates to a multi-wavelength optical fiber amplifier that is capable of providing high output power.

BROADBAND OPERATION

Next generation lightwave networks will use fiber amplifiers which are formed of gain optical fibers, the cores of which contain a dopant such as rare earth ions. Such an amplifier receives an optical signal containing wavelength $\lambda_s$ and a pump signal containing wavelength $\lambda_p$; these signals are coupled to the gain fiber by means such as one or more couplers located at one or both ends of the amplifier. In a multi-channel network, such as a wavelength division multiplexed network, where two or more signals of different wavelengths are used to transmit information, each of the channels must have about the same gain. In a long haul transmission system, if the gain of one channel of each amplifier is different from that of another channel, serious problems can result. After passing through many amplifiers, the signal of one channel A can be many dB greater than that of the signal of another channel B. This difference of signal level between the two channels can result in an optical transmission system which, at best, may be marginal in performance. For example, if after passing through all of the network amplifiers, channel A is at a level which provides a good signal to noise ratio, the channel B signal, which experiences less gain, may be at a signal level which has a very low signal to noise ratio. In fact, the signal to noise ratio of channel B may be too low for that channel to be useful.

Additionally, each amplifier can provide only a finite amount of power to the signals being amplified. While the power of the amplifier is available to both channels, frequently it is not divided equally between the two channels. Often, the larger of the two signals will capture a proportionately larger portion of the available power and leave a disproportionate smaller share of the available power for the weaker signal. Thus, the stronger signal gets progressively stronger, relative to the weaker signal, as the two signals advance through the amplifiers of a long haul transmission line.

Clearly, a need exists for amplifier gain equalization in an optical fiber amplifier. Total achievable output power is another critical performance characteristic for in-line amplifiers.

U.S. Pat. No. 5,050,949 discloses a multistage optical fiber amplifier for providing gain equalization. That optical fiber amplifier comprises at least two stages of amplification where each stage comprises an amplifying fiber having a different gain spectrum. In one embodiment the two stages have different dopant compositions to provide each stage with a different gain spectrum. The gain of each stage of the multistage amplifier is dependent upon the power of the pump signal supplied to the gain fiber. Typically, gain equalization can adjust the gain of one channel while maintaining the gain of a second channel constant. When used in combination with automatic gain control, the amplifier gain can be equalized dynamically to compensate for random variations in the relative optical power of wavelength-multiplexed signals to prevent system impairment caused by low-power channels. Such a multistage fiber amplifier, which is most effective for operation at only two channels, is not optimized for power.

The multistage fiber amplifier disclosed in U.S. Pat. No. 5,111,334 is formed of a plurality of stages that are different from one another so that each achieves maximum gain for a different wavelength. The series connection of a plurality of such amplifiers seeks to provide a more constant gain over a broader wavelength range than a single amplifier fiber. By employing practically achievable variations in gain fiber composition, this technique flattens the gain over only a rather small wavelength range. Furthermore, changing gain fiber composition not only changes the positions of the gain peaks; it can also sharpen or broaden the gain peaks. Employing gain fiber having sharper peaks may actually result in less gain flatness outside a small wavelength range. Furthermore, multistage fiber amplifiers of the type disclosed in that patent are not optimized for power.

For erbium-doped fiber amplifiers operating over the spectral range from 1537 nm to 1565 nm, gain flatness superior to that obtained by the techniques disclosed in U.S. Pat. Nos. 5,050,949 and 5,111,334 can be achieved by simply adding a substantial amount of alumina to the gain fiber and optimizing the gain fiber length. The amount of alumina introduced as a codopant into the gain fiber core is usually up to about 5 wt. %. Erbium gain fibers having low alumina content can be made with negligibly low passive loss; however, passive loss increases with increasing alumina concentration due to scattering. For example, a passive loss of 0.033 dB/m has been measured in a gain fiber containing 2.63 wt. % alumina. Passive loss in gain fibers attenuates both the signal and the pump power; thus, it limits the achievable output power.

Some broad-banded multistage fiber amplifiers employ identical alumina-containing gain fibers in each stage. A sufficient amount of alumina is present in each of the gain fibers to obtain the required flatness. However, such a high alumina concentration in the output stage of the multistage amplifier limits the achievable output power due to higher passive loss.

NOISE CAUSED BY SIGNAL LEAKAGE

Serially connected fiber amplifiers can be provided with pump power from the same source. The pump power can be applied to the first stage, and residual pump power that is not used in the first stage can be coupled to the second stage. For example, see Configuration 1 of the publication J. M. P. Delavaux et al., "REAP: Recycled Erbium Amplifier Pump", IEEE Photonics Technology Letters, Vol. 6, No. 3, March, 1994, pp. 376–379. A 2×2 wavelength division multiplexer (WDM) coupler MUX II couples the pump energy to the second stage through a first path and couples the signal to the second stage through a second path that has a filter for attenuating the ASE. Some signal can leak, due to the finite crosstalk of the WDM coupler, through the pump path to the second stage gain fiber in the same direction but out of synchronization with the principle signal, whereby the noise figure of the amplifier is degraded due to multipath interference (MPI). In Configuration 2 of the Delavaux et al. publication, the principle signal and the leakage signal propagate counterdirectionally through the gain fiber, whereby the particular source of MPI noise in configuration 1 is effectively eliminated in configuration 2. However, some signal, after being amplified by the second stage gain fiber, can leak through the WDM coupler MUX II, due to its finite crosstalk, back into the first gain fiber. The amplified leakage signal is then coupled by WDM coupler MUX II to the input port or the pump port. Some of this leakage signal can be back reflected by the input connector or pump laser facet and then interfere with the principal signal, whereby further MPI noise would arise. In a practical situation, this path becomes the dominant MPI noise path, and it can lead to a serious degradation in amplifier performance. Additionally, overclad WDM couplers of the 2×2 configuration are more difficult to fabricate than overclad 1×2 WDM's. Overclad couplers are disclosed in U.S. Pat. No. 5,268,979.

SUMMARY OF THE INVENTION

An object of the present invention is to provide a fiber amplifier that overcomes the disadvantages of prior art devices. Another object is to provide a fiber amplifier that provides relatively high output power at a balanced gain spectrum within the operating wavelength window. A further object is to provide a fiber amplifier having a stage that utilizes remnant pump power from a previous stage and yet exhibits a low noise figure, including MPI noise.

Briefly, the present invention relates to a hybrid fiber amplifier having coupled input and output stages. The input stage has a given passive loss and a flattened gain spectrum. The output stage has a passive loss that is lower than the given passive loss and gain spectrum that is less flat than input stage.

In accordance with a further embodiment, a multistage fiber amplifier comprises first and second gain fibers, each of which has first and second ends. A source of pump power and a signal are coupled to the first end of the first gain fiber. A first WDM coupler has an input terminal for receiving a signal and pump power and has a first output terminal to which most of the signal is coupled and a second output terminal to which most of the pump power is coupled. The second end of the first gain fiber is coupled to the input terminal of the first coupler. A filter connects the first output terminal of the first WDM coupler to the first end of the second gain fiber. An output device such as a second WDM coupler connects the second output terminal of the first coupler to the second end of the second gain fiber. Any leakage signal propagating from the second output terminal of the first coupler to the second end of the second gain fiber propagates counterdirectionally through the second gain fiber with respect to the principal signal coupled to the second gain fiber from the first output terminal of the first coupler. Thus, the effect of such leakage signal on amplifier noise will be negligible. Furthermore, any of the amplified signal at the second end of the second gain fiber is inhibited from propagating to the first gain fiber because of the presence of the output device and the first WDM coupler in the path between the second end of the second gain fiber and the second end of the first gain fiber.

BRIEF DESCRIPTION OF THE DRAWINGS

FIG. 1 is a schematic illustration of a fiber amplifier embodying the present invention.

FIG. 2 is a schematic illustration of a further embodiment of the invention.

DETAILED DESCRIPTION

The present invention relates to a hybrid fiber amplifier design which employs two gain fibers having different compositions to achieve higher output power at a balanced gain spectrum within the operating wavelength window. Higher output power is achieved by trading off gain flatness. This can be accomplished in a systematic way to accommodate different system requirements.

Whereas erbium-doped gain fibers are specifically discussed herein, this invention applies to gain fibers employing any rare earth dopant for achieving signal amplification as well as any codopant used for the purpose of modifying the shape of its gain curve and/or for the purpose of facilitating the fabrication of the gain fiber.

Heretofore, alumina has been employed to improve the solubility of erbium in a germania-silicate glass gain fiber core and to flatten the gain spectrum. In an in-line amplifier having a pre-amplification stage for amplifying the weak input signals and a power amplification output stage, both stages would employ high alumina content, flat gain spectrum fiber amplifiers when balanced gain spectrum was desired. However, passive loss increases with increasing alumina concentration. Therefore, computer modeling was employed for the purpose of analyzing modifications of this amplifier. More specifically, the analysis involved varying the compositions of the pre-amplifier and/or the power output stages.

For amplifiers operating under gain compression, passive loss in gain fibers has a larger impact on output signal power when it occurs closer to the output. On the other hand, the gain flatness of a gain fiber has a larger impact on the overall gain flatness of the amplifier when the gain fiber provides a preponderance of the overall gain, as is typically the case for the preamlifier stage of the amplifier. Therefore, in the hybrid design of the present invention, gain fibers having a lower passive loss (lower alumina concentration, for example) are used close to the output of the multistage amplifier, while the higher loss, flat gain fiber (higher alumina concentration, for example) is used close the input. The exact combination, in terms of gain fiber lengths and compositions, is determined by the specific system requirements. For Ge-Er-Al-doped $SiO_2$ gain fibers used in in-line fiber amplifiers, the alumina concentration of the first stage should be at least about 2 wt. %, and that of the output stage should be no more than about 1 wt. %.

An embodiment of the invention is shown in FIG. 1 wherein a multistage fiber amplifier 21 comprises pre-amplifiction stage 22 and power-amplification stage 23. Amplifier 21 is pumped by a single source 30 which divides the pump power between the stages so that the amplifier achieves high pump power-to-signal conversion efficiency. Laser diodes 31 and 32 of source 30 are connected to a 3 dB coupler 33 which provides equal amounts of pump power to WDM couplers 34 and 35. The gain of the amplifier will drop by no more than 4 dB if one of the sources fails, due to the use of coupler 33 in the pump source.

A signal of wavelength $\lambda_s$ is coupled from input 24 to gain fiber 37 by isolator 29 and WDM coupler 34. The amplified signal is coupled to gain fiber 38 by WDM coupler 40 and path 26 which includes ASE filter 41 and isolator 42. The length of gain fiber 37 is insufficient to convert all of the pump power supplied thereto by couplers 33 and 34 to amplified signal and ASE. Gain fiber 37 might absorb only 50% of the pump power, for example. The remnant pump power from gain fiber 37 is connected to gain fiber 38 by coupler 40 and path 25 which includes one leg of coupler 44. This remnant pump power pumps gain fiber 38 in the reverse direction.

Due to the finite signal crosstalk of WDM coupler 40, some signal light leaks into the pump path 25. However, the leakage signal from path 25 propagates through gain fiber 38 in a direction opposite to the direction of propagation or the principal signal. Therefore, the effect of the leakage signal on amplifier noise will be negligible.

Moreover, an MPI source results from the leakage of amplified signal from gain fiber 38 through WDM coupler 44 back to gain fiber 37, and back reflected by the input connector or the pump laser facets. This MPI source can be significantly reduced (by at least the WDM coupler crosstalk) by using two 1×2 WDM couplers 40 and 44. Thus, the use of couplers 40 and 44 is an improvement over Configuration 2 of the Delavaux et al. publication wherein a single 2×2 WDM coupler MUX II is employed to connect two gain fibers.

The amplified signal is coupled from gain fiber 38 to gain fiber 45 by WDM couplers 44 and 35, coupler 35 supplying pump power to gain fiber 45. The amplified output from gain fiber 45 is connected to output 46 by isolator 47 and pump wavelength filter 48. Isolators 29, 42 and 47 suppress reflection noise. Optional pump filter 48 protects downstream elements from pump light that might be deleterious to them.

In a specific embodiment of FIG. 1 in which amplifier 21 was designed as an in-line amplifier in a long haul telecommunication system, first and second stage gain fibers 37 and 38 of pre-amplification stage 22 had 5 $\mu$m diameter cores formed of $SiO_2$ doped with 16.69 wt. % $GeO_2$, 2.63 wt. % alumina and 0.07 wt. % erbium, whereby they had an optimum gain flatness of about 0.017 dB/dB between 1549 nm and 1561 nm and a passive loss of about 0.033 dB/m. The gain flatness for a given operating condition and for a given wavelength window (e.g. 1549 nm to 1561 nm) is defined as the maximum gain in that window minus the minimum gain in that window divided by the maximum gain in that window. Third stage gain fiber 45 of power amplifier 23 had a 4 $\mu$m diameter core formed of $SiO_2$ doped with 20.73 wt. % $GeO_2$, 0.63 wt. % alumina and 0.03 wt. % erbium, whereby it had an optimum gain flatness of 0.051 dB/dB between 1549 nm and 1561 nm and a negligible passive loss. The gain fibers had a $SiO_2$ cladding having a diameter of 125 $\mu$m. Because of their high alumina content, gain fibers 37 and 38 of stages 1 and 2 exhibited a passive loss of 0.033 dB/m, while the passive loss of low alumina content gain fiber 45 of stage 3 was negligibly small, i.e. the passive loss of a 10 m length of the fiber was too small to be measured. Laser diodes 31 and 32 provided pump power at a wavelength of 980 nm. Numerical modeling results show that this hybrid design yields 0.5 dB more output power, by trading off 0.3 dB gain flatness, as compared to a design that uses the high alumina content gain fiber for all three stages.

The pre-amplification stage and the power amplification stage can each be formed of stages different in number from that illustrated in FIG. 1. The terms "pre-amplification stage" and "power amplification stage" as used herein have a functional rather than a physical connotation. In the embodiment shown in FIG. 2, the pre-amplification stage and the power amplification stage are embodied in a single physical amplifier stage in which two different gain fibers 55 and 57 are connected together by fusion splice 56. The higher loss, flat-gain spectrum gain fiber 55 is located close the signal input terminal 54, while the lower loss gain fiber 57 is located close to the output terminal 58. For example, fiber 55 may have a higher alumina concentration than fiber 57, but this embodiment is not limited to this combination of gain fibers. The serial connection of gain fibers 55 and 57 can be forward pumped as illustrated in FIG. 2. However, gain fibers 55 and 57 could be reverse pumped or co-pumped by application of the pump power to the appropriate terminal or terminals by WDM couplers or the like.

In addition to effects such as the alumina concentration, passive loss of a gain fiber is affected by the numerical aperture (NA) and the erbium confinement. Gain fibers having a higher NA have a better optical mode confinement for both the pump and the signal light. Such fibers are useful for achieving low noise and high gain operation in an input stage, especially in a low-pump power situation. However, higher NA fibers have higher loss caused by scattering. This higher loss limits the output power when such a gain fiber is used in the output stage. Additionally, gain fibers with a tighter Er confinement (Er confined within a small radius at the center of the fiber core) are effectively used in the input stage to assure high inversion, but they are not useful for the output stage due to the higher loss resulting from the longer length of gain fiber needed to achieve the same amount of gain (at constant Er concentration). Therefore, gain fibers with higher NA and tighter Er confinement should be used close to the input, while gain fibers with lower NA and less confined Er ions should be used close to the output.

While the above arrangements are descriptive of various embodiments of the present invention, it is to be understood that there exist various other modifications which are considered to fall within the scope of this disclosure. For example, while erbium is now considered as the dopant of choice for doped fiber amplifiers for use in telecommunication systems, there exist many other materials (such as other rare earth elements, praseodymium, for example) which may be used (for amplification at other signal wavelengths) and which may utilize pump signals at wavelengths other than that discussed above. Co-dopants other than alumina can be employed to alter the flatness of the gain spectrum of a rare earth-doped fiber amplifier. For example, fluorine has a broadening effect on the gain spectrum of a Ge-Er-doped $SiO_2$ gain fiber. Moreover, erbium-doped flurozirconate glass has an extremely flat gain spectrum. Such fluoride base glasses are disclosed at pages 38 to 44 of *Optical Properties of Glass*, edited by D. R. Uhlmann and N. J. Kreidl, published by the American Ceramic Society, Inc. The use of rare-earth-doped fluorozirconate glasses for fiber amplifiers is discussed in the publication "Lightwave", vol. 11, No. 8, July 1994, p. 6. Since erbium-doped flurozirconate glass is relatively lossy at wavelengths in, the 1555 nm range, that gain fiber would be employed at the input stage of the fiber amplifier while a low loss gain fiber such as a Ge-Er-doped $SiO_2$ gain fiber containing less than about 5 wt. % alumina could be used at the output stage.

I claim:

1. A multistage fiber amplifier comprising
   an input stage having a given passive loss and a flattened gain spectrum, and
   an output stage coupled to said input stage, said output stage having a passive loss that is lower than said given passive loss and gain spectrum that is less flat than input stage.

2. A multistage fiber amplifier in accordance with claim 1 wherein said input stage comprises a first gain fiber doped with active dopant ions capable of producing stimulated emission of light within a predetermined band of wavelengths and with a co-dopant which flattens the gain spectrum of said first gain fiber.

3. A multistage fiber amplifier in accordance with claim 2 wherein said output stage comprises a second gain fiber doped with active dopant ions capable of producing stimulated emission of light within a predetermined band of wavelengths and with a co-dopant which flattens the gain spectrum of said second gain fiber, said second gain fiber having a lower concentration of said co-dopant than said first gain fiber.

4. A multistage fiber amplifier in accordance with claim 3 wherein the numerical aperture of said first gain fiber is greater than the numerical aperture of said second gain fiber.

5. A multistage fiber amplifier in accordance with claim 3 wherein said active dopant ions are erbium ions and said co-dopant is alumina.

6. A multistage fiber amplifier in accordance with claim 3 wherein said active dopant ions are erbium ions and said co-dopant is fluorine.

7. A multistage fiber amplifier in accordance with claim 1 wherein said input stage comprises a first gain fiber doped with active dopant ions that are confined within a first radius, and said output stage comprises a second gain fiber doped with active dopant ions that are confined within a radius that is greater than said first radius.

8. A multistage fiber amplifier in accordance with claim 7 wherein the numerical aperture of said first gain fiber is greater than the numerical aperture of said second gain fiber.

9. A multistage fiber amplifier in accordance with claim 1 wherein said input and output stages comprise first and second gain fibers, the numerical aperture of said first gain fiber being greater than the numerical aperture of said second gain fiber.

10. A multistage fiber amplifier in accordance with claim 1 wherein said input stage comprises a first gain fiber the composition of which comprises a fluorozirconate glass, said fiber having a core that is doped with active dopant ions.

11. A multistage fiber amplifier in accordance with claim 1 wherein said input stage consists of a pre-amplification stage including at least a first gain fiber and said output stage consists of a power amplification stage including at least a second gain fiber, the signal output from said pre-amplification stage being coupled to said power amplification stage by at least one wavelength division multiplexer coupler.

12. A multistage fiber amplifier in accordance with claim 11 wherein said first gain fiber is doped with active dopant ions capable of producing stimulated emission of light within a predetermined band of wavelengths and with a co-dopant which flattens the gain spectrum of said first gain fiber.

13. A multistage fiber amplifier in accordance with claim 12 wherein said second gain fiber is doped with active dopant ions capable of producing stimulated emission of light within a predetermined band of wavelengths and with a co-dopant which flattens the gain spectrum of said second gain fiber, said second gain fiber having a lower concentration of said co-dopant than said first gain fiber.

14. A multistage fiber amplifier in accordance with claim 13 wherein the numerical aperture of said first gain fiber is greater than the numerical aperture of said second gain fiber.

15. A multistage fiber amplifier in accordance with claim 13 wherein said active dopant ions are erbium ions and said co-dopant is alumina.

16. A multistage fiber amplifier in accordance with claim 13 wherein said active dopant ions are erbium ions and said co-dopant is fluorine.

17. A multistage fiber amplifier in accordance with claim 11 wherein said pre-amplification stage comprises said first gain fiber and a third gain fiber, each of which has first and second ends, each of said first and second gain fibers exhibiting said given passive loss and said flattened gain spectrum, a second wavelength division multiplexer coupler having an input terminal for receiving a signal and pump power and having a first output terminal to which most of said signal is coupled and a second output terminal to which most of said pump power is coupled, the second end of said first gain fiber being coupled to the input terminal of said second coupler, a filter connecting the first output terminal of said second coupler to the first end of said third gain fiber, and one fiber of said at least one wavelength division multiplexer coupler connecting the second output terminal of said second coupler to the second end of said third gain fiber, whereby any leakage signal from said second wavelength division multiplexer coupler to the second end of said third gain fiber propagates counterdirectionally through said third gain fiber with respect to the signal coupled to said second gain fiber from the first output terminal of said second coupler.

18. A multistage fiber amplifier in accordance with claim 1 wherein said input stage and said output stage comprise first and second optical gain fibers, an end of said first gain fiber being fused to an end of said second gain fiber.

19. A multistage fiber amplifier comprising first and second gain fibers, each of which has first and second ends, a source of pump power coupled to the first end of said first gain fiber, means for coupling a signal to the first end of said first gain fiber, a first wavelength division multiplexer coupler having an input terminal for receiving a signal and pump power and having a first output terminal to which most of said signal is coupled and a second output terminal to which most of said pump power is coupled, the second end of said first gain fiber being coupled to the input terminal of said first coupler, a filter connecting the first output terminal of said first multiplexer coupler to the first end of said second gain fiber, and an output device connecting the second output terminal of said first coupler to the second end of said second gain fiber, whereby any leakage signal propagating from the second output terminal of said first coupler to the second end of said second gain fiber propagates counterdirectionally through said second gain fiber with respect to the principal signal coupled to said second gain fiber from the first output terminal of said first coupler, and whereby any of the amplified signal at the second end of said second gain fiber is inhibited from propagating to said first gain fiber because of the presence of said output device and said first multiplexer coupler in the path between the second end of said second gain fiber and the second end of said first gain fiber.

20. A multistage fiber amplifier in accordance with claim 19 wherein said output device is a second wavelength division multiplexer coupler.

* * * * *